Feb. 14, 1961    E. J. SVENSON    2,971,341
MACHINE TOOL CONTROL MEANS
Original Filed June 16, 1954    7 Sheets-Sheet 1
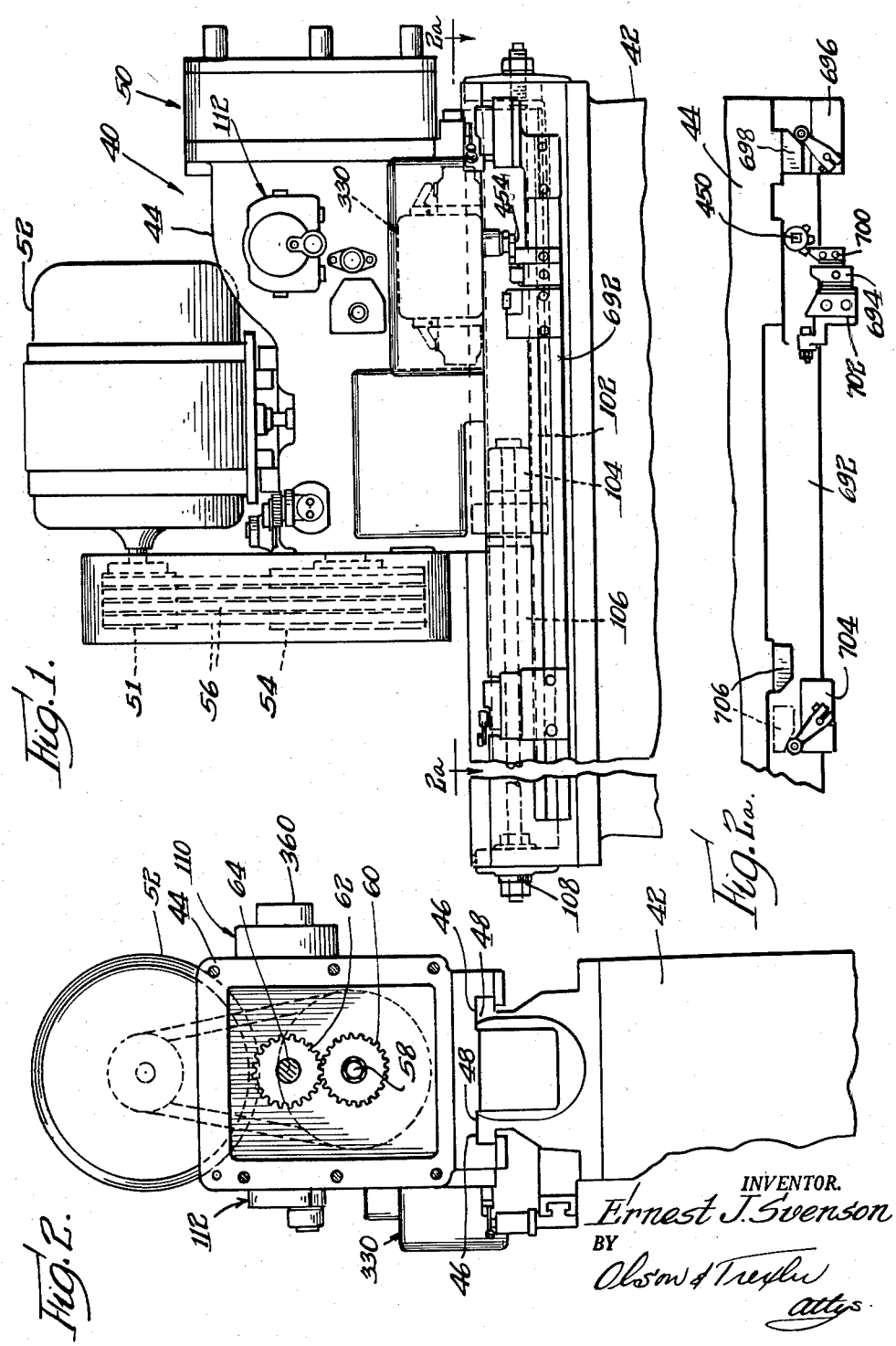
INVENTOR.
Ernest J. Svenson
BY
Olson & Trexler
attys.

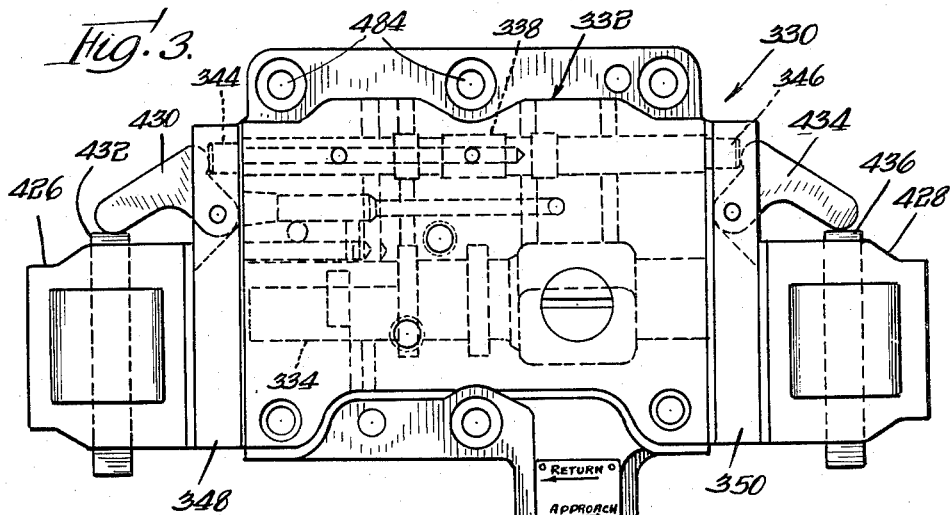
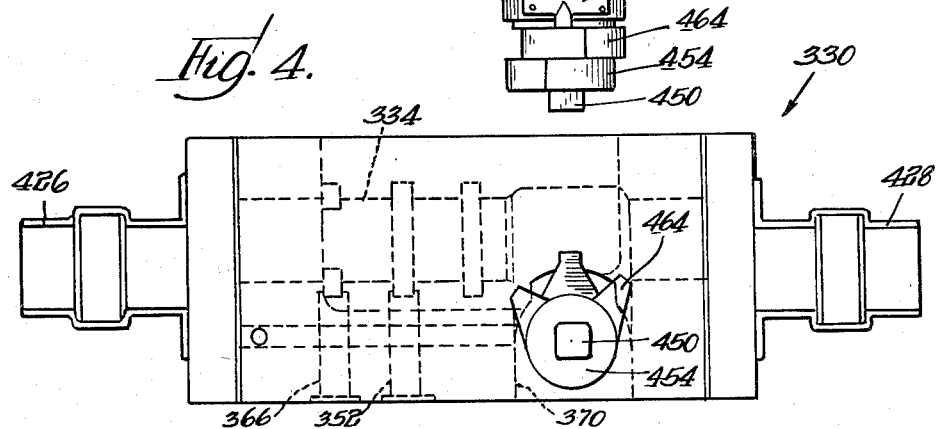
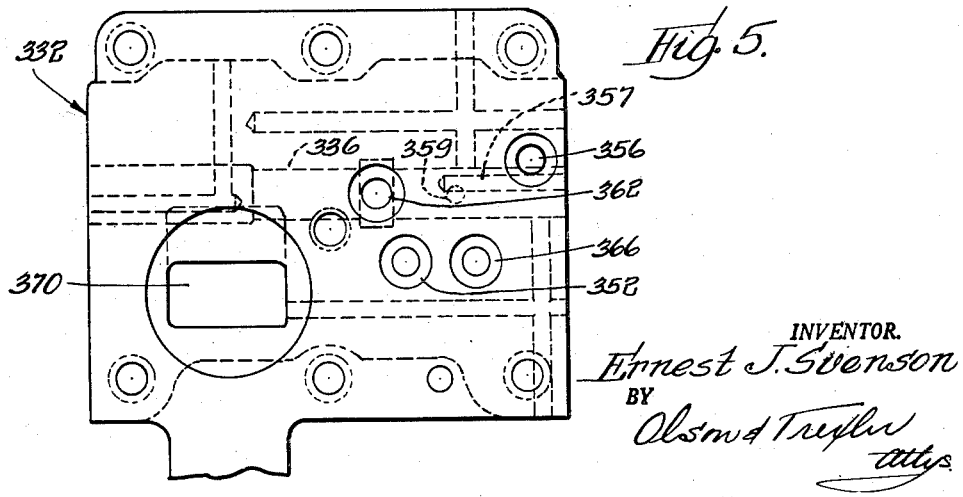

Feb. 14, 1961 E. J. SVENSON 2,971,341
MACHINE TOOL CONTROL MEANS
Original Filed June 16, 1954 7 Sheets-Sheet 3

INVENTOR.
Ernest J. Svenson
BY
Olson & Trexler
attys.

Feb. 14, 1961 E. J. SVENSON 2,971,341
MACHINE TOOL CONTROL MEANS
Original Filed June 16, 1954 7 Sheets-Sheet 4

Fig. 8.
Neutral

Fig. 9.
Rapid Advance

INVENTOR.
Ernest J Svenson
By Olson & Trexler attys

Feb. 14, 1961    E. J. SVENSON    2,971,341
MACHINE TOOL CONTROL MEANS
Original Filed June 16, 1954    7 Sheets-Sheet 5

Fig. 10.
Feed

Fig. 11.
Rapid Return

INVENTOR.
Ernest J Svenson
By Olson & Trexler attys

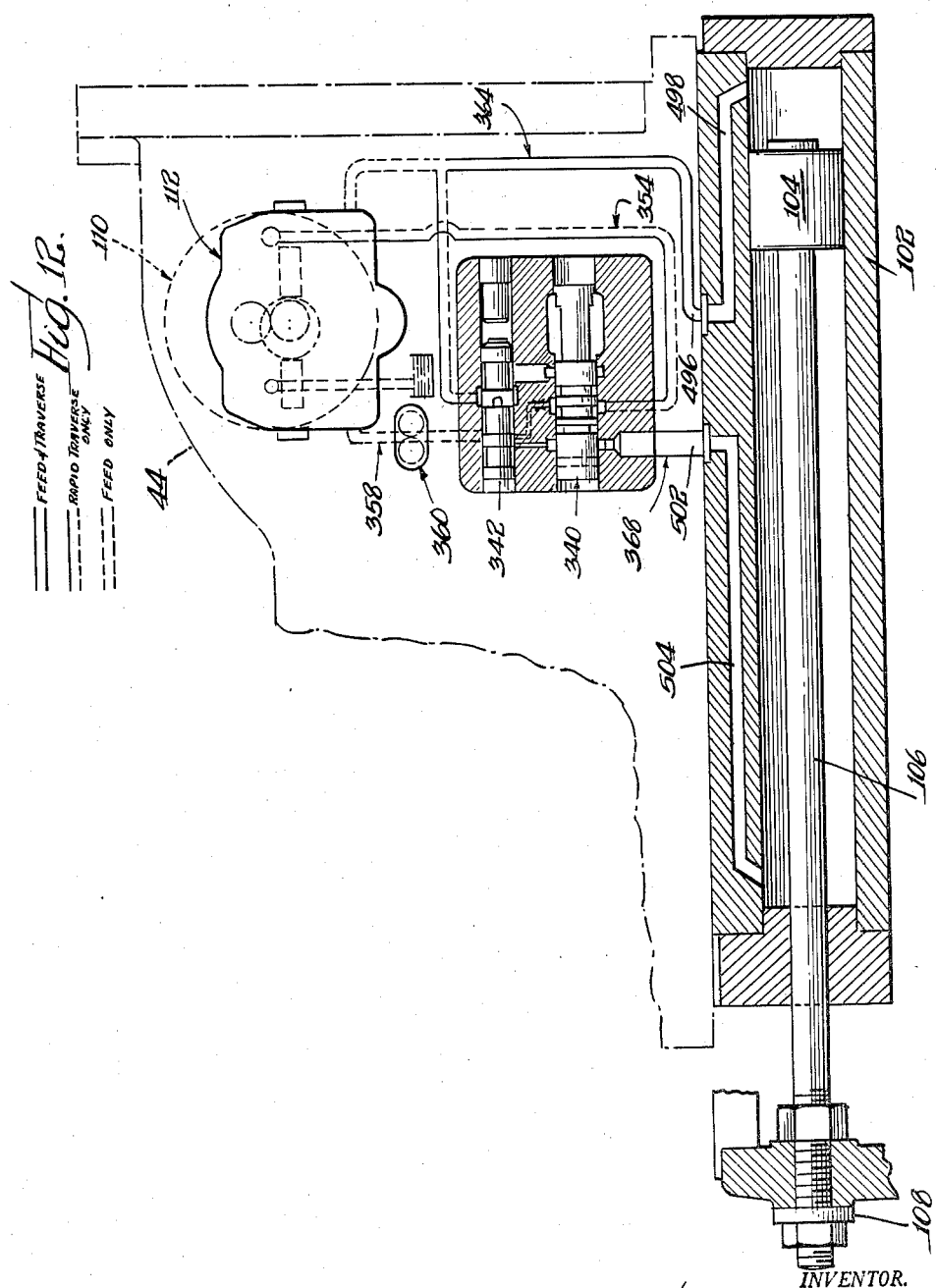

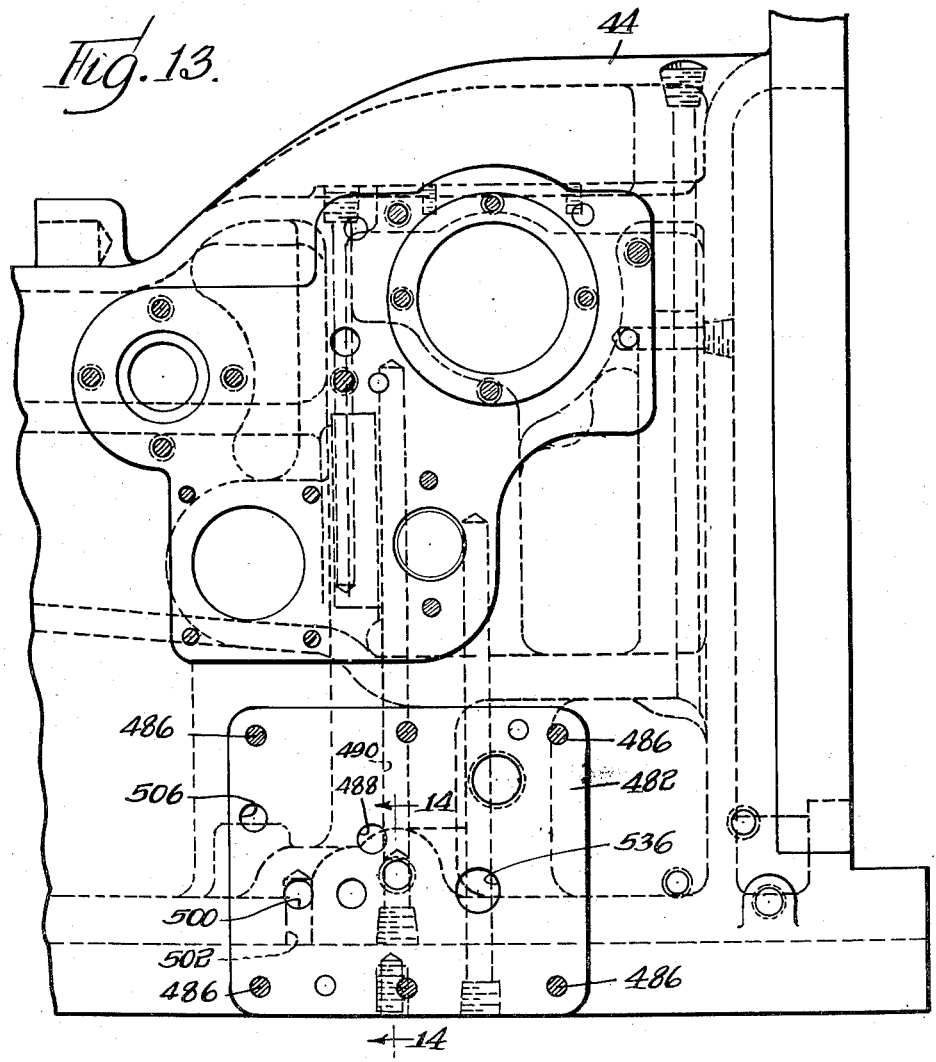
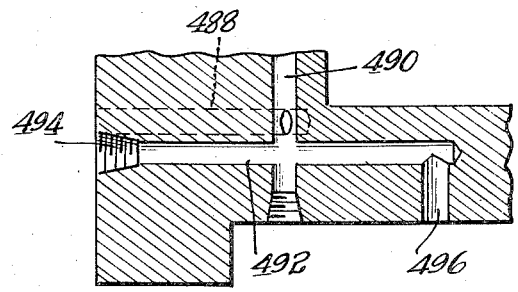

United States Patent Office 2,971,341
Patented Feb. 14, 1961

2,971,341
MACHINE TOOL CONTROL MEANS

Ernest J. Svenson, Rockford, Ill., assignor, by mesne assignments, of one-half to W. F. and John Barnes Company, Rockford, Ill., a corporation of Illinois, and one-half to Odin Corporation, Rockford, Ill., a corporation of Illinois Original application June 16, 1954, Ser. No. 437,067, now Patent No. 2,921,437, dated Jan. 19, 1960. Divided and this application Mar. 19, 1959, Ser. No. 800,540

8 Claims. (Cl. 60—52)

The present invention relates to novel metal working apparatus and more particularly to "self-contained" machine tool units which are hydraulically translated on support ways.

This application is a division of my co-pending application Serial No. 437,067, filed June 16, 1954, now Patent No. 2,921,437, issued January 19, 1960.

One object of the present invention is to provide a novel metal working apparatus or self-contained machine tool unit having a hydraulic control system constructed and arranged so that there are a minimum of external conduits and couplings whereby the apparatus may be operated and maintained more efficiently.

Still another object of the present invention is to provide an apparatus of the above described type with a hydraulic control system having novel pump means of simplified construction whereby to promote more efficient operation and ease of maintenance.

A further object of the present invention is to provide novel apparatus of the above described type which includes a hydraulic control system having improved control valve means which may be mounted and operated in a simple and efficient manner for directing hydraulic fluid from suitable pump means to cause reciprocating movement of a machine element and for causing a slower feeding movement of the machine element.

Other and more detailed objects and advantages of the present invention will become apparent from the following description and the accompanying drawings wherein:

Fig. 1 is a side elevational view of an apparatus embodying the novel features of the present invention;

Fig. 2 is a right hand and elevational view of the apparatus shown in Fig. 1;

Fig. 2a is a cross sectional view taken along the line 2a—2a of Fig. 1;

Fig. 3 is a side elevational view of the novel control valve of the present invention;

Fig. 4 is a bottom view of the control valve shown in Fig. 3;

Fig. 5 is a rear view of the novel control valve shown in Fig. 3;

Figs. 8–11 are semi-diagrammatic cross sectional views of the novel control valve, respectively, showing the valve elements in neutral, rapid advance, feed, and rapid return positions;

Fig. 12 is a sectional view of the hydraulic actuator for the sliding head together with a schematic illustration of fluid supply circuits for the actuator;

Fig. 13 is an enlarged fragmentary front elevational view of the sliding head casting of the apparatus shown in Fig. 1; and Fig. 14 is a partially sectioned fragmentary view taken along the line 14—14 of Fig. 13.

Figure 6:
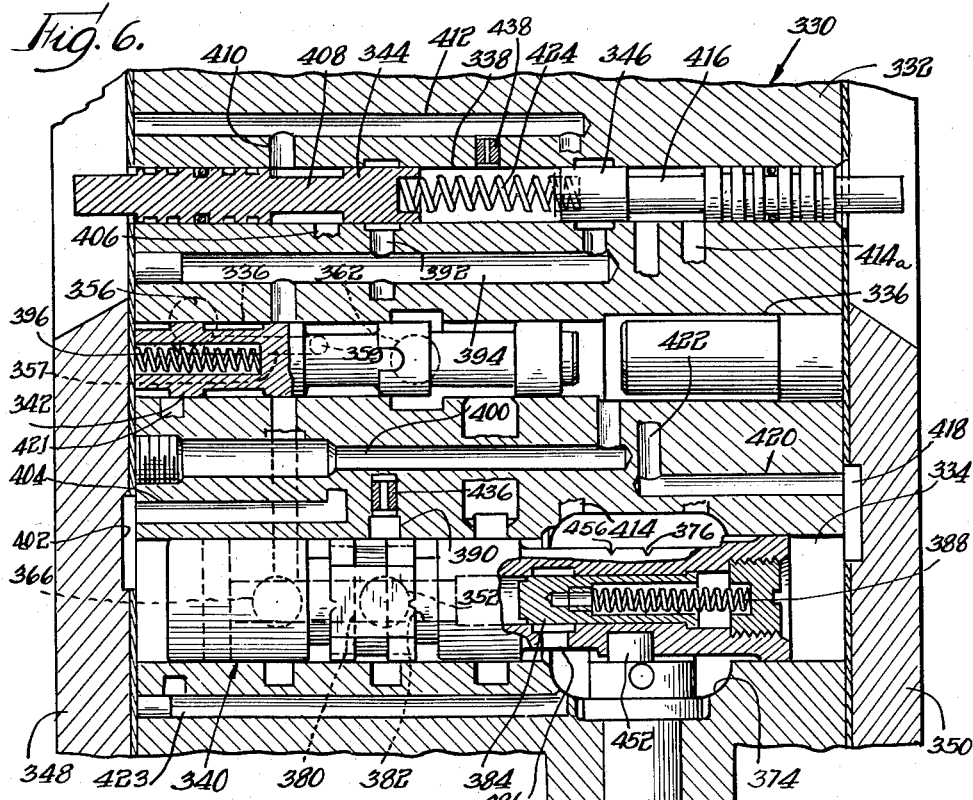
Fig. 6 is a somewhat diagrammatic cross sectional view of the novel control valve taken along line 6—6 in Fig. 7.
Figure 7:
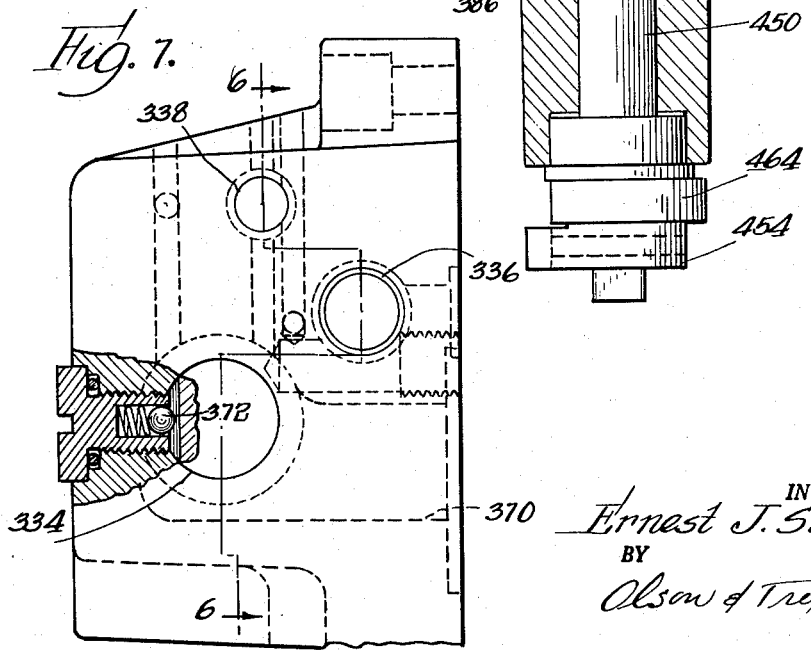
Fig. 7 is an end elevational view of the novel control valve.

Referring now more specifically to the drawings wherein like parts are designated by the same numerals throughout the various figures, the apparatus shown for the purpose of illustrating the present invention includes one or more self-contained machine tool units 40 as shown best in Figs. 1 and 2.

Mechanical and supporting structures

As shown best in Figs. 1 and 2, the self-contained unit 40 of this invention is adapted to be slidably mounted on a base structure 42 and to this end the unit 40 includes a head casting 44 that is provided with guideways 46 which cooperate with guideways 48 on the base structure. A suitable spindle head 50 is mounted to the face of the head casting by means of screws or the like, not shown, and an electric motor 52 is mounted on the head casting for driving the spindles through pulleys 51 and 54, a plurality of V-belts 56 and a drive shaft 58. The pulley 54 is mounted on one end of the drive shaft 58 and a gear 60 is fixed on the opposite end of the drive shaft which gear meshes with one or more pickoff gears 62 mounted on spindle drive shafts 64.

In order to reciprocate the self-contained unit 40 on the base 42, a fluid motor is provided. This motor includes a hydraulic cylinder 102 secured to the head frame 44, a piston 104 disposed within the cylinder and a piston rod 106 which is fixed to the base as indicated at 108. Preferably, the piston rod is adjustably secured to the base by a pair of nut members.

In order to actuate the fluid motor, a rapid traverse gear pump 110 and a feed pump 112 have been provided, which pumps are mounted or connected on opposite sides of the head frame 44, as shown best in Fig. 2. Both pumps 110, 112 are driven from the central shaft 58 through transmission means, not shown, contained in the head frame 44.

The two pumps 110, 112 are used to supply operating fluid to the translating cylinder 102 through a control valve 330 which embodies certain principles of the present invention. As will become apparent, the control valve 330 is constructed so that a complete cycle of movement of the head frame or casting 44 includes a rapid forward traverse motion, a slower forward feed motion, and a rapid return motion. In addition, the valve is provided with a stop or neutral position between the rapid advance and rapid return positions.

The valve 330 includes a body 332 which is provided with transversely extending passageways 334, 336 and 338, respectively, receiving a main valve structure 340, a feed valve stem 342 and a pair of pilot valve stems 344 and 346, Figs. 6–11. A pair of end plates 348 and 350 are secured to the opposite ends of the body member. The valve body 332 is provided with an inlet passageway 352 which is adapted to be connected to the main outlet 156 of the pump structure 110 by conduit or passageway means 354 described in detail below and schematically shown in Figs. 12 and 8 through 11. Another passageway 356 in the valve body is adapted to be connected to the inlet side of the feed pump 112 through suitable conduit means 358 and the pre-charging pump section of the pump structure 110, which, for the purpose of better illustration, has been schematically shown as separate from the remainder of the pump structure 110 in Figs. 12 and 8 through 11 and is generally designated by the numeral 360. The passageway 356, as shown in Fig. 6, is connected to the feed valve stem passageway by passageways 357 and 359. The valve body member 332 is further provided with a passageway 362 which is adapted to be connected to the forward end of the hydraulic cylinder 102 through suitable conduit means 364. It should also be noted that the discharge side of the feed pump 112 is connected to the conduit means 364. A passageway 366 is formed in the valve body member, which passageway is adapted to be connected to the rear end of the cylinder 102 through suitable conduit means 368. A relatively large drain passageway 370 is also provided in the valve body member, which drain passageway is connected with the main reservoir in the manner more fully described below.

The various valve stems of the control valve structure are shown in the neutral position in Figs. 6 and 8. In this position, the main valve stem 340 is generally centrally located within the passageway or bore 334 and it is releasably retained in this position by means of a spring pressed ball detent 372 shown in Fig. 7. The detent is located within an enlarged chamber 374 and is engageable with a groove 376 formed in the main valve stem for retaining the main valve stem in the neutral position for which the flow of fluid from the rapid traverse pump is through the passageway 352 and into the central portion of the main valve stem passageway 334 and around a central spool portion 378 of the main valve stem. Then, the fluid passes through a transverse passageway 380 formed in the spool portion of the main valve stem and into a centrally located axially extending passageway 382 within the main valve stem. A spring-operated orifice or circulating valve 384 is disposed within the passageway 382 and is operable to permit fluid to pass out of the passageway 382 through a passageway 386 and into the detent chamber 374 from where the fluid passes through the drain passageway 370 back to the reservoir. The pressure relief or circulating valve 384 may be of any suitable construction and includes adjustable spring means 388 so that the pressure at which the relief valve opens may be varied as desired. Preferably, the relief valve should be set to open when the pressure is between 35 and 55 pounds per square inch.

While the valve stems are in the neutral position, fluid under pressure from the rapid traverse pump will be maintained in a passageway 390 that connects with the central portion of the main valve stem passageway and also connects with passageways 392 and 394 which are blocked by the pilot valves 344 and 346, respectively. At the same time, fluid under pressure is maintained in the right hand end of the feed valve stem passageway 336 to maintain the feed valve stem in its neutral position, which valve stem is resiliently biased toward the right by means of a spring 396. The fluid under pressure is introduced into the right hand end of the valve stem passageway 336 through the passageway 398 which connects the central portion of the valve stem passageway 334 with a suitably drilled passageway 400.

While the various valve stems are in the neutral position, the opposite ends of the main valve stem passageway 334 and the left end of the feed valve passageway 336 are connected with the detent chamber 374 and, thus, the drain passageway 370. More specifically, the left hand end of the main valve stem passageway 334 communicates with passageways 402, 404 and 406 which connected with the pilot valve passageway 338 in alignment with a reduced diameter portion 408 of the pilot valve stem 344. From this portion of the pilot valve passageway, the fluid passes into a passageway 410 and thence into a passageway 412. The passageway 412 is connected with the detent chamber 374 by means of a passageway 414. In the simplified diagrammatic disclosures of Figs. 8 through 11, the passageway 414 is shown as intersecting the pilot valve passageway in alignment with a reduced diameter portion 416 of the pilot valve stem 346 so that the passageway 414 also serves as a drain for the right hand end of the main valve stem passageway which is connected with the pilot valve stem passageway through passageways 418, 420 and 422. However, in the structure disclosed in Fig. 6, a separate drain line 414a is provided between the detent chamber 374 and the pilot valve stem passageway for draining the right hand end of the main valve stem passageway. The left end of the feed valve stem passageway is connected to the drain by passageways 421 and 423.

In order to operate the pilot valves which are normally retained in the neutral position by means of a compression spring 424 disposed therebetween, solenoids 426 and 428 are mounted on opposite ends of the control valve structure. A lever 430 is pivotally mounted on the end plate 348 and is operable by the plunger 432 when the solenoid 426 is energized to shift the pilot valve stem 344. A similar lever 434 is pivotally mounted on the end plate 350 and is operable by the plunger 436 for actuating the pilot valve stem 346.

The cycle of the sliding head frame work casting is initiated by energizing the solenoid 426 so that the pilot valve stem 344 is shifted to the position shown in Fig. 9. With the pilot valve stem 344 in this position, the passageway 392 is unblocked while the drain passageway 410 is closed. Thus, the fluid under pressure is permitted to flow through the passageway 392 and a restricted orifice member 436 disposed therein which serves to reduce the flow rate and prevent too rapid shifting of the main valve stem as explained below. During the time the pilot valve stem is shifted, fluid between the pilot valves is forced through a restricted orifice member 438 into the drain line 412, which restricted orifice member serves to meter the fluid and prevent fluid from the right end of the main valve stem passageway from forcing the pilot valve stem 344 back out. The fluid passing from the passageway 392 flows through the passageways 402, 404 and 406 and into the left end of the main valve stem passageway 334 to shift the main valve stem toward the right without undue force. The solenoid 426 may then be de-energized, allowing the spring 424 to return the pilot valve stem 334 to its neutral position without causing any change in the position of the main valve stem.

With the main valve stem in the position shown in Fig. 9, the fluid under pressure from the rapid traverse pump passes across suitable flats provided in the spool portion 378 of the main valve stem and through a passageway 440 to the feed valve stem passageway 336. Then the fluid passes out through the passageway 362 into the conduit means 364 and to the hydraulic cylinder 102 for causing rapid advance or traverse of the head frame. Fluid from the rear end of the hydraulic cylinder 102 flows through the conduit means 368 and into the passageway 366, a transverse passageway 442 formed in the main valve stem, the centrally located passageway 382 in the main valve stem and thence out through the relief valve 384. It should be noted that with the main valve stem in the rapid advance position, fluid under pressure is still available in the right end of the feed valve stem passageway 336 for holding the feed valve stem against the compression spring 396 since the main valve stem is provided with an L shaped passageway 444 located to communicate with the passageway 398. The feed valve stem is provided with flats 462 to permit charging of the feed pump during rapid approach.

At the end of the rapid advance movement of the sliding head frame, the main valve stem 340 is shifted to the position shown in Fig. 10. In order to accomplish this shifting of the main control valve stem, a shaft 450 is journalled in the valve body as shown in Fig. 6, which shaft is provided with a control finger 452 extending into a suitable slot in the main valve stem. A cam member 454 is secured to the shaft 450 for engagement with a fixed control dog which will be described below. The main valve stem is held in this position by the ball detent 372 which enters a groove 456. In this position, the main control valve stem blocks the passageway 440 so that a major portion of the fluid being circulated by the rapid traverse pump is returned to the reservoir through the spring-operated orifice or circulating valve 384 and another portion of the fluid passes through the passage 390 to the outlet 356 from where it is directed to the charging or pre-loading pump 360 and the feed pump 112 and finally into the hydraulic cylinder 102. It should be noted that when the main control valve stem is in the position shown in Fig. 10, the left hand end of the main valve stem passageway 334 is connected with the drain and the right hand end of the feed valve stem passageway 336 is also connected with the drain through passageways 398 and 400 and an L shaped passageway 458 formed in the main valve stem and connecting the passageway 398 and the left hand end of the main valve stem passageway. Thus, the pressure in the right hand end of the feed valve stem passageway is relieved so that the spring 396 shifts the feed valve stem toward the right to the position shown in Fig. 10. With the feed valve stem in this position, fluid under pressure from the rapid traverse pump passes through the passageways 390 and 394 and to the feed valve stem passageway 336 at a position in alignment with a reduced diameter or spool portion 460 of the feed valve stem. The pressure of the fluid in this portion of the feed valve stem passageway is determined by the setting of the circulating valve or spring-operated orifice 384, and it should be noted that the return line 368 from the hydraulic cylinder is also connected with this portion of the feed valve stem passageway so that the cylinder 102 is operated against a back pressure determined by the setting of the circulating valve 384. The fluid returning through the line 368 is recirculated through the feed valve stem passageway and to the feed pump so that a substantially closed feeding fluid circuit of the general type disclosed in my Patent No. 2,388,716, dated November 13, 1945, is provided. The above mentioned restricted orifice or passage member 436 does permit sufficient fluid to pass into the feeding fluid circuit to compensate for the fact that the volume of fluid in the end of the cylinder in which the piston rod is located is insufficient to fill the opposite end of the cylinder. With this arrangement, positive and accurate control of the relative movement between the piston and the hydraulic cylinder is obtained during feeding movement of the main head frame.

At the end of the feeding movement of the sliding head frame, the solenoid 428 is energized in the manner described below so that the pilot valve 346 is shifted to the position shown in Fig. 11. With the pilot valve 346 in this position, fluid flows through the passageways 418, 420 and 422 and into the right hand end of the main control valve stem passageway 334 to shift the main control valve stem to the position shown in Fig. 11. At any time after the main control valve stem has been shifted to the left, the pilot valve 346 may be permitted to return to its normal position by de-energizing the solenoid 428 without causing a change in the position of the main control valve. With the main control valve stem in the position shown in Fig. 11, it is seen that fluid under pressure from the rapid traverse pump will enter the passageway 352 and cross suitable flats formed in the spool portion 378 of the main valve stem and then pass through the passageway 366 and to the rear end of the hydraulic cylinder 102 through the line 368. At the same time, fluid under pressure is restored to the right hand end of the feed valve stem passageway 336 so that the feed valve stem is shifted toward the left against the action of the spring 396. With the main and feed valve stems in the positions shown in Fig. 11, the forward end of the hydraulic cylinder 102 is connected with the drain through the lines 358 and 364 which return the fluid to the feed valve stem passageway 336. The feed valve stem passageway is, in turn, connected to a portion of the main valve stem passageway which is open to the drain by the passageway 440. At the end of the return movement of the sliding main head frame, the main control valve stem is again shifted to the neutral position by means of a cam 464 which is mounted on the shaft 450 and which engages a fixed control dog described below.

A stationary control bar 692 which is shown in Figs. 1 and 2a is provided for the sliding head unit and is mounted to the base 42 by any suitable means. The bar 692 serves as a support for a plurality of control dogs and limit switches. More specifically, a control dog 694 is provided for actuating the above described cam 454 of the control valve structure for shifting the main control valve stem to the feed position and a switch device 696, which is operated by a cam 698 on the sliding head, is provided for energizing the solenoid 428, Fig. 3, which operates the pilot valve stem 346 in a manner so that the main valve stem is shifted to the reverse position. In addition, a safety device in the form of a dog 700 is provided for engaging the cam 454 and shifting the main valve stem to a neutral position in the event of a failure of the operation of the switch 696 or the electrical control circuit. Still, another dog 702 is mounted on the bar for engaging the cam 464 to shift the main valve stem to the neutral position at the end of the reverse stroke. A limit switch 704 which is operated by a cam 706 on the sliding head is also provided for opening the electric circuit to deenergize the reverse solenoid 428 when the sliding head reaches its home position.

The control valve body 332 is mounted against a machined surface 482 on the front side of the head frame structure 44, Fig. 13. The control valve 330 is tightly secured against the surface 482 by means of screws which are passed through apertures 486 in the head frame. As shown best in Fig. 13, the head frame 44 is formed with a passageway 488 which is located to register with the passageway 362 of the control valve structure. The passageway 488 communicates with a vertically extending passageway 490 which intersects a transversely extending passageway 492, Fig. 14, having its outer end closed by plug 494 and having its inner end connected with a downwardly extending passageway 496, Fig. 12. The passageway 496 is connected to the forward end of the hydraulic cylinder 102 through a suitable passage 498 formed in the body of the hydraulic cylinder, which body is secured against the bottom of the head frame structure by any suitable means, not shown. The head frame 44 is provided with a transversely extending passage 500, Fig. 13, which registers with the passageway 366 in the control valve body 332 and which also communicates with a downwardly extending passage 502. The passage 502 is connected with the rear end of the hydraulic cylinder 102 through a suitable passage 504 formed in the cylinder body, Fig. 12.

The head frame structure is provided with a passageway 506 which opens at the surface 482 and communicates with the passageway 356 of the control valve body 332. The fluid flowing into the passageway 506 is conducted by suitable passageway or conduit means, not shown, to the inlet of a charging or pre-loading pump section 360 of the pump structure 110, Figs. 1 and 12.

Another passageway 536 in the machined surface 482 of the sliding head frame 44 connects the drain passageway 370 of the control valve 330 with the reservoir.

*Statement of operation*

Assuming the sliding head frame structure 44 to be in home or withdrawn position, the operator initiates operation of the machine by first closing a switch, not shown, to effect energization of the motor or prime mover 52 of the head frame structure or unit 40. As the motor begins, the traverse pump 110 and feed pump 112 begin the circulation of the hydraulic actuating fluid. At this time, the control valve structure 330 is in neutral position, Fig. 8, so that the fluid delivered by the pumps is merely idly circulated.

The operator then actuates the start button of switch, not shown, to cause the energization of the forward solenoid 426, Fig. 3. The solenoid 426 functions to shift the control valve structure 330 to the rapid advance position, Fig. 9, in the manner fully set forth above. Thus, fluid is directed from the rapid traverse and feed pumps through the control valve structure and to the hydraulic cylinder 102 to effect rapid advance or approach movement of the sliding head. As the head structure moves away from home position, the solenoid 426 is de-energized. As the head reaches its feed position, its associated control dog causes the mechanical shifting of the main valve stem 340 into the feed position wherein fluid from the rapid traverse pump is cut off from the hydaulic cylinder and the cylinder is actuated at a slower rate by fluid from the feed pump. At the end of the feeding stroke, the limit switch 696, Fig. 2a, is actuated to energize the reverse solenoid 428 which causes the main valve stem to shift to the reverse position. Fluid is now circulated from the rapid traverse pump to the hydraulic cylinder to effect rapid reverse movement. As the head frame 44 returns to the home position, the solenoid 428 is de-energized. Immediately after the de-energization of the solenoid 428 and as the head frames reach home position, the control dog 702 functions to shift the main valve stem of the control valve structure to neutral position.

While the preferred embodiment of the present invention has been shown and described herein, many structural details may be changed without departing from the spirit and scope of the appended claims.

The invention is claimed as follows:

1. In a fluid control system for a self-contained machine tool unit or the like, a control valve structure comprising a main body, said body having a first passageway adapted to be interconnected with an outlet of a rapid traverse pump, a second passageway adapted to be interconnected with a fluid motor, a third passageway adapted to be interconnected with an inlet of a feed pump, and a fourth passageway adapted to be interconnected with said fluid motor, a main valve stem shiftable within said valve body for selectively directing fluid from said first passageway to said other passageways, a second valve stem shiftable within said body in response to shifting of said main valve stem for controlling the flow of fluid into said third passageway, and pilot valve stem means shiftable within said body for causing shifting of said main valve stem.

2. In a fluid control system for a self-contained machine tool unit or the like, a control valve structure comprising valve body means, said body having a first passageway adapted to be interconnected with an outlet of a rapid traverse pump, a second passageway adapted to be interconnected with a fluid motor, a third passageway adapted to be interconnected wtih an inlet of a feed pump, a fourth passageway adapted to be interconnected with the fluid motor and a drain passageway, a main valve stem shiftable within said body means for selectively directing fluid from said first passageway to said other passageways, a second valve stem shiftable within said body means in response to the shifting of said main valve stem for controlling the flow of fluid into said third passageway, a pair of pilot valve stems shiftable within said body means for selectively causing shifting of said main valve stem in opposite directions, and electrical means for actuating said pilot valve stems.

3. A control valve for a fluid actuating system comprising a main body having a first passageway adapted to be interconnected with fluid pressure generating means, a second passageway adapted to be interconnected with a fluid motor, a third passageway adapted to be interconnected with the fluid motor, a fourth passageway adapted to be interconnected with feeding fluid pressure generating means, and a drain passageway, a first member disposed within said body means for controlling the flow of fluid through said passageways and shiftable from a neutral position to rapid advance, feed and rapid return positions, a second member disposed within said body means and shiftable to block said third passageway when said first member is in said feed position, said body having conduit means therein extending between said first passageway and opposed portions of said first mentioned member, a pair of pilot valves slidably disposed within said body for controlling the flow of fluid through said conduit means, electrical means for selectively actuating said pilot valves to direct fluid through said conduit means to one of said opposed portions of said first mentioned member to shift said first mentioned member to the rapid advance position and to direct fluid through said conduit means to the other of said opposed portions to shift said first mentioned member to said rapid return position, and cam means operably connected with said first mentioned member for shifting said first mentioned member from the rapid advance position to the feed position and from the rapid return position to the neutral position.

4. A self-contained machine tool unit comprising, in combination, a base, a head assembly movably mounted on said base for translation thereon, a fluid motor interconnected with said head assembly for translating the latter on said base, a rapid traverse pump, a feed pump, a control valve comprising a main body; said body having a first passageway interconnected with the outlet of said rapid traverse pump, a second passageway interconnected with one side of said fluid motor, a third passageway interconnected with the inlet of said feed pump, and a fourth passageway interconnected with the other side of said motor; means for interconnecting the outlet of said feed pump with said motor, a main valve stem shiftable within said valve body for selectively directing fluid from said first passageway to said other passageways, a second valve stem shiftable within said body in response to shifting of said main valve stem for controlling the flow of fluid into said third passageway, and pilot valve stem means shiftable within said body for causing shifting of said main valve stem.

5. A self-contained machine tool unit comprising, in combination, a base, a head assembly movably mounted on said base for translation therealong, a fluid motor connected to said head assembly for translating the latter on said base and having two fluid connections thereto which determine in accordance with the supply to the respective connections of fluid under pressure the direction of translation of said head assembly on said base, a rapid traverse pump, a feed pump, a control valve structure comprising a valve body means; said body means having a first passageway interconnected with the outlet of said rapid traverse pump, a second passageway interconnected with said fluid motor through one of said fluid connections thereof, a third passageway interconnected with the inlet of said feed pump, a fourth passageway interconnected with the other of said fluid connections to said fluid motor, and a drain passageway; a main valve stem shiftable within said body means for selectively directing fluid from said first passageway to said other passageways, a second valve stem shiftable within said body means in response to the shifting of said main valve stem for controlling the flow of fluid into said third passageway, means for interconnecting the outlet of said feed pump to said one fluid connection to said fluid motor, a pair of pilot valve stems shiftable within said body means for selectively causing shifting of said main valve stem in opposite directions, and electrical means for actuating said pilot valve stems.

6. A control valve for a machine tool fluid actuating system, comprising, in combination; a main body having a first passageway adapted to be interconnected with fluid pressure generating means, a second passageway adapted to be interconnected with a fluid motor, a third passageway adapted to be interconnected with the fluid motor, a fourth passageway adapted to be interconnected with feeding fluid pressure generating means, and a drain passageway; a first member disposed within said body means for controlling the flow of fluid through said passageways and being shiftable from a neutral position to rapid advance, feed, and rapid return positions; a second member disposed within said body means and shiftable to block said third passageway when said first member is in said feed position, said body means defining passage means therein extending between said first passageway and opposed portions of said first member, pilot valve means housed within said body controlling the flow of fluid through said passages to said opposed portions of said first member to effect shifting of said first member in opposite directions, electrical means coacting with said pilot valve means to operate the latter to direct fluid to one of said opposed portions of said first member to shift said first member to the rapid advance position thereof and alternatively to direct fluid to the other of said opposed portions of said first member to shift said first member to said rapid return position thereof, and mechanical control means connected with said first member for shifting the latter from the rapid advance position thereof to the feed position thereof and for shifting the first member from the rapid return position thereof to the neutral position thereof.

7. For use on a machine tool having a head frame defining a plurality of passages opening therethrough, a fluid control system comprising, in combination, a body adapted to be demountably secured to the machine tool head frame in covering relation to the passages therein; said body having a first passageway opening outwardly therethrough to be interconnected with the outlet of a rapid traverse pump, a second passageway opening outwardly therethrough to be interconnected with a fluid motor, a third passageway opening outwardly therethrough to be interconected with the inlet of a feed pump, a fourth passageway opening outwardly therethrough to be interconnected with the fluid motor, and a fifth passageway opening outwardly therethrough to be connected to drain; said passageways opening outwardly through said body in positions for registering with corresponding passages in the machine tool head frame, a main valve stem shiftable within said body for selectively directing fluid from said first passageway to said other passageways, a second valve stem shiftable within said body in response to shifting of said main valve stem for controlling the flow of fluid into said third passageway, a pressure control valve carried within said main valve stem to connect said first passageway with said fifth passageway in accordance with the position of said main valve stem, and pilot valve means shiftable within said body for causing shifting of said main valve stem.

8. In a fluid control system for a machine tool, control valve structure comprising, in combination; a valve body having a first passageway adapted to be interconnected with an outlet of a rapid traverse pump, a second passageway adapted to be interconnected with a fluid motor, a third passageway adapted to be interconnected with the inlet of a feed pump, a fourth passageway adapted to be interconnected with the fluid motor, and a drain passageway; a main valve stem shiftable within said body for selectively directing fluid from said first passageway to said other passageways, a pressure control valve carried by said main valve stem to be interconnected between said first passageway and said drain passageway when said main valve stem is shifted to a position for connecting said first passageway to said drain passageway, a second valve stem shiftable within said body in response to the shifting of said main valve stem for controlling the flow of fluid into said third passageway, pilot valve means housed within said valve body and interconnected through passages in said body with said main valve stem to effect shifting of said main valve stem from one position to another, and restricted passage means connected in series with said pilot valve means for metering the rate of fluid flow therethrough to effect shifting of said main valve stem.

References Cited in the file of this patent

UNITED STATES PATENTS

| | | |
|---|---|---|
| 1,943,061 | Douglas | Jan. 9, 1934 |
| 1,970,181 | Monroe | Aug. 14, 1934 |
| 1,972,462 | Schafer | Sept. 4, 1934 |
| 1,972,560 | Heller | Sept. 4, 1934 |
| 2,276,358 | Vickers | Mar. 17, 1942 |
| 2,388,716 | Svenson | Nov. 13, 1945 |
| 2,559,125 | Lee | July 3, 1951 |
| 2,594,664 | Livers et al. | Apr. 29, 1952 |